(12) United States Patent
Kinstler

(10) Patent No.: US 7,558,903 B2
(45) Date of Patent: *Jul. 7, 2009

(54) INTERFACING A LEGACY DATA BUS WITH A WIDEBAND WIRELESS DATA RESOURCE UTILIZING AN EMBEDDED BUS CONTROLLER

(75) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 202 days.

This patent is subject to a terminal disclaimer.

(21) Appl. No.: 11/538,784

(22) Filed: Oct. 4, 2006

(65) Prior Publication Data

US 2007/0255884 A1    Nov. 1, 2007

Related U.S. Application Data

(63) Continuation-in-part of application No. 10/412,183, filed on Apr. 11, 2003, now Pat. No. 7,152,134.

(51) Int. Cl.
*G06F 15/00* (2006.01)

(52) U.S. Cl. .................. 710/315; 710/306; 710/63; 710/72

(58) Field of Classification Search .......... 710/305–307, 710/313–315, 8–12, 62–72; 455/431, 445; 709/223–226

See application file for complete search history.

(56) References Cited

U.S. PATENT DOCUMENTS

| | | | |
|---|---|---|---|
| 5,848,294 A | 12/1998 | Clark | |
| 5,875,313 A | 2/1999 | Sescila et al. | |
| 5,898,801 A | 4/1999 | Braun et al. | |
| 5,991,546 A | 11/1999 | Chan et al. | |
| 6,169,746 B1 | 1/2001 | Ueda et al. | |
| 6,202,103 B1 | 3/2001 | Vonbank et al. | |
| 6,266,729 B1 | 7/2001 | Leung et al. | |
| 6,356,968 B1 | 3/2002 | Kishon | |
| 6,362,768 B1* | 3/2002 | Younis et al. | 341/155 |
| 6,507,579 B1 | 1/2003 | Gresham | |
| 6,615,116 B2 | 9/2003 | Ebert et al. | |
| 6,693,895 B1 | 2/2004 | Crummey et al. | |
| 6,831,926 B1 | 12/2004 | Kinstler | |
| 6,904,530 B2 | 6/2005 | Frank | |
| 2003/0061325 A1* | 3/2003 | Monroe | 709/223 |

(Continued)

*Primary Examiner*—Raymond N Phan
(74) *Attorney, Agent, or Firm*—Yee & Associates, P.C.; Clifford G. Cousins

(57) ABSTRACT

Various methods and systems provide interfaces between legacy data buses such as MIL-STD 1553 buses and wideband wireless data links such as links compatible with IEEE 802.11 or IEEE 802.16e. One technique for interfacing a legacy bus to a wideband wireless data communication link involves providing a hybrid bus controller/remote interface unit as an interface between the two data communication architectures. In operation, the legacy interface suitably receives data intended for a legacy node from a wireless radio module that is compatible with a designated broadband wireless data communication protocol. The legacy data is converted in the legacy interface/remote interface unit to at least one legacy word having a legacy format for transmission on the legacy data bus. The legacy interface may be further configured to receive a reply message from the legacy component on the legacy data bus, and to forward a reply to the wireless radio module in a format that is compatible with the designated wireless data communication protocol.

22 Claims, 7 Drawing Sheets

U.S. PATENT DOCUMENTS

| | | |
|---|---|---|
| 2003/0101310 A1 | 5/2003 | Granato et al. |
| 2004/0133704 A1* | 7/2004 | Krzyzanowski et al. ..... 709/250 |
| 2004/0205284 A1 | 10/2004 | Kinstler |

* cited by examiner

INTERFACING A LEGACY DATA BUS WITH A WIDEBAND WIRELESS DATA RESOURCE UTILIZING AN EMBEDDED BUS CONTROLLER

CROSS-REFERENCE TO RELATED APPLICATION

This application is a continuation-in-part of U.S. patent application Ser. No. 10/412,183 now U.S. Pat. No. 7,152,134, filed Apr. 11, 2003.

TECHNICAL FIELD

Embodiments of the present invention generally relate to data communications technologies, and more particularly relate to systems and techniques for interfacing legacy equipment to high-speed wireless data communication architectures and networks.

BACKGROUND

Modern computing and control systems such as those found in aircraft and spacecraft typically include multiple sensing and/or processing components that are interconnected by a data network. Systems used in a typical avionics environment include flight management systems, air data computers, engine and air sensors, flight control systems, cockpit instrumentation and the like.

As the various computing systems used in these environments become increasingly capable, wideband data communications technologies have evolved to support faster data transfer rates between components and systems in many aerospace, industrial, transportation and other settings. The IEEE 1394b standard, for example, describes a bus implementation that supports data transfer speeds of 800 Mbps or higher over a serial connection. Other wideband data connection technologies providing high-speed data transfer include fiber data definition interface (FDDI), asynchronous transfer mode (ATM), Fiber Channel, Fast Ethernet and the like. Moreover, a number of broadband wireless data communication techniques, protocols, and technologies have been developed, including IEEE 802.11, IEEE 802.15.1, and IEEE 802.16e.

Even as new data communications technologies become increasingly prevalent, however, legacy systems based upon older technologies continue in widespread use. Many of these systems remain in operation due to their high reliability, and due to the relatively long periods of time often required to design, build and obtain government certification for newer systems. Systems and components designed to communicate using the MIL-STD 1553 standard, for example, have been widely deployed in aviation, space and other environments for many years. MIL-STD 1553 networks typically include a bus controller (BC) that controls traffic on a redundant bus that interconnects various remote terminal (RT) client nodes. MIL-STD 1553 generally specifies that data is transferred between nodes in packets of not more than thirty-two data words (with each word including sixteen data bits and four control bits) across redundant twisted-pair wires with a data rate on the order of 1.0 MHz. The MIL-STD 1553B standard (which was a revision of earlier MIL-STD 1553 standards) was released as a tri-service/NATO standard in 1978, and is widely available.

It is generally desirable for the legacy and non-legacy components within an aircraft, spacecraft or other environment to share data and otherwise interoperate with each other. In particular, it is generally desirable to interface legacy components with newer bus technologies to take advantage of the increased bandwidth available, and to eliminate the need to provide legacy wiring throughout the vehicle or other environment. Often, however, difficulties arise in interfacing older "legacy" systems to newer technologies. MIL-STD 1553 components, for example, are highly reliable, yet generally incompatible with newer wideband technologies without significant modification. Although several products are available to interface legacy components to newer data networks, problems often remain in implementation of these products. As an example of a design difficulty to be overcome, MIL-STD 1553 typically specifies that each transmitting component receive a "handshake" response from the receiving component within fourteen microseconds of the original data transmission. While this requirement is relatively easy to meet on a conventional MIL-STD 1553 bus, it is often difficult to meet in practice when legacy components communicate across other types of data connections. In particular, the fourteen microsecond handshake period limits the ability to locate bus controllers and remote terminals on separate bus segments, thereby limiting design flexibility. Accordingly, difficulties remain in achieving true integration between the various computing systems and components operating within an avionics or other environment. Moreover, the cost, weight and complexity of providing separate legacy and wideband networks can present significant issues in highly demanding environments.

It is therefore desirable to allow legacy systems such as those based upon MIL-STD 1553 to communicate across newer high-speed data buses such as those based upon IEEE 1394, wireless data communication protocols, and other standards. Further, it is desirable to use high-speed wireless data communication resources to interconnect legacy bus controllers and remote terminals without requiring additional cabling or excessive modifications to the legacy components. It is therefore highly desirable to create systems and methods for interfacing legacy equipment to wireless high-speed data arrangements. Furthermore, other desirable features and characteristics of the present invention will become apparent from the subsequent detailed description and the appended claims, taken in conjunction with the accompanying drawings and the foregoing technical field and background.

BRIEF SUMMARY

Various methods and systems provide interfaces between legacy data buses such as MIL-STD 1553 buses and wideband wireless data communication resources, data transport mechanisms, links, and/or channels such as IEEE 802.11 or IEEE 802.16(e) links. One technique for interfacing a legacy bus to a wideband wireless data communication resource involves providing a hybrid bus controller/remote interface unit as an interface between the two data communication protocols. In operation, the legacy interface suitably receives data intended for a legacy node from a wireless radio module that is compatible with a broadband wireless data communication protocol. The legacy data is converted to at least one legacy word having a legacy format for transmission on the legacy data bus. The legacy interface may be further configured to receive a reply message from the legacy component on the legacy data bus, and to reformat the reply for a wireless radio module that is compatible with a broadband wireless data communication protocol.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1A:
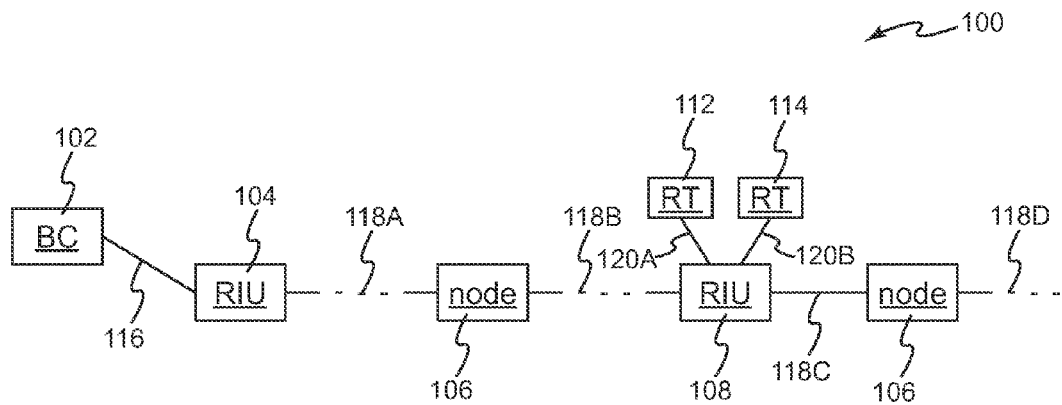
FIG. 1A is a block diagram of an exemplary system facilitating legacy data transmission on a high-speed data bus.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures depict example arrangements of elements, additional intervening elements, devices, features, or components may be present in an embodiment of the invention.

According to various embodiments, legacy systems such as those based upon MIL-STD 1553 technologies are appropriately interfaced to high-speed, wideband data networks and/or buses using one or more remote interface units (RIUs) or other legacy interfaces. Each interface suitably receives data intended for a legacy node from a wideband data bus capable node. The legacy data is converted to a legacy format for transmission on the legacy data bus. The legacy interface may be further configured to receive a reply to the wideband data bus capable node message from the legacy component on the legacy data bus, and to forward the reply to the wideband data bus capable node component. The legacy data may be divided into relatively small data packets to facilitate transmission in relatively narrow timeslots on the wideband bus, and to thereby reduce latency during transmission. In various embodiments, the functions of a legacy bus controller may be incorporated into a remote interface unit that bridges a legacy bus to the wideband network. In such embodiments the interface appropriately provides handshake responses and/or status responses to the legacy components as appropriate to avoid timeout errors.

By implementing the systems and techniques described herein, legacy nodes are suitably allowed to share data and/or to otherwise interoperate with wideband nodes without requiring significant modification. Moreover, the number of legacy buses (and associated cabling) required in many data sharing environments may be reduced by providing legacy traffic across wideband networks rather than the comparatively limited legacy buses.

As used herein, the terms "component" and "device" are intended to broadly encompass any computers, computing devices, sensors, input/output devices, modules and/or processes that are capable of processing or gathering data, and that are capable of communicating in any data communications environment. Unless context dictates otherwise, the term "bus" as used herein is intended to broadly encompass any serial or parallel bus architecture or topology, as well as any other network or other inter-connection between computing devices. "High speed" buses as described herein may include any wideband digital, optical, wireless or other networking or bus technology or protocol. Similarly, the term "legacy" systems is intended to encompass MIL-STD 1553, as well as any other technologies, systems, components and/or protocols that may be adapted for use on high-speed buses as described herein.

With reference now to FIG. 1A, an exemplary system 100 for interfacing legacy systems to a wideband data bus suitably includes one or more remote interface units (RIUs) 104/108 allowing a legacy bus controller 102 to communicate with one or more remote terminals (RTs) 112/114 across a wideband bus 118. RIUs 104/108 are any systems, processing cards, or other computing devices capable of interfacing legacy components to wideband buses, and are described in additional detail below. Bus controller (BC) 102 is any conventional card, application or device that is responsible for directing the flow of data on one or more legacy bus segments 120 as appropriate. In the case of MIL-STD 1553 bus controllers, each bus segment 116/120 may have one or more bus controllers, although only one may be active at any time. RTs 112/114 are any devices and/or processes capable of communicating over legacy bus segments 120A and 120B, respectively, and may include data sensors (e.g., a radio altimeter), navigation aids, or the like. Although two legacy bus segments 112/114 are shown in system 100, any number of legacy buses and/or segments may be provided in a wide array of equivalent embodiments.

Wideband bus 118 is any bus or other network interconnection capable of transmitting data between RIUs 104 and 108 or between wideband capable nodes 106 and RIUs 104/108. In an exemplary embodiment, wideband bus 118 includes several data bus segments 118A-D operating in compliance with the IEEE 1394b specification, although other wideband bus or network technologies such as other versions of IEEE 1394, Fiber Channel or Fast Ethernet could be used in equivalent embodiments. FIG. 1 also shows several nodes 106 operating on wideband bus 118 in a native mode. To continue the example using IEEE 1394b buses, the various nodes 106 and RIUs 104/108 are suitably inter-connected by various bus segments 118A-D in a linear fashion, although other network topologies (e.g., tree, ring, hub and the like) could be used in alternate embodiments.

In operation, bus controller 102 suitably communicates with remote terminals 112/114 and manages traffic on legacy bus segments 120A-B via remote interface units 104/108. Data originating from BC 102 is provided in legacy format from BC 102 to RIU 104 via legacy bus segment 116, which may operate using the same standards and/or protocols as bus segments 120A-B. RIU 104 suitably receives data across bus segment 116 and contacts RIU 108 via wideband bus 118 to transfer the data as appropriate. In various exemplary embodiments, RIU 104 transfers legacy data from legacy BC 102 by dividing the data into several smaller portions and requesting immediate and/or acknowledge-accelerated arbitration access to wideband bus 118. RIU 108 suitably receives the data portions from RIU 104, re-assembles the data in legacy format, and provides the data to the destination RT 112/114 via legacy bus segments 120A-B. Return data is sent via an opposite path, with the sending RT 112/114 providing data to RIU 108 via legacy bus segments 120A-B, which obtains timeslots on wideband bus 118 to transfer the data to RIU 104. RIU 104, in turn, re-assembles the data and provides the resulting data in legacy format to BC 102 via legacy bus segment 116. In a further embodiment, timeout limits (e.g. time budgets allocated for responses by RTs 112/114) on the various legacy components are adjusted to compensate for the additional delays incurred during transit, as described more fully below. Alternatively, RIUs 104/108 may provide status words to transmitting legacy components to notify them that return data is in transit, thereby preventing timeout errors from occurring.

Figure 1B:
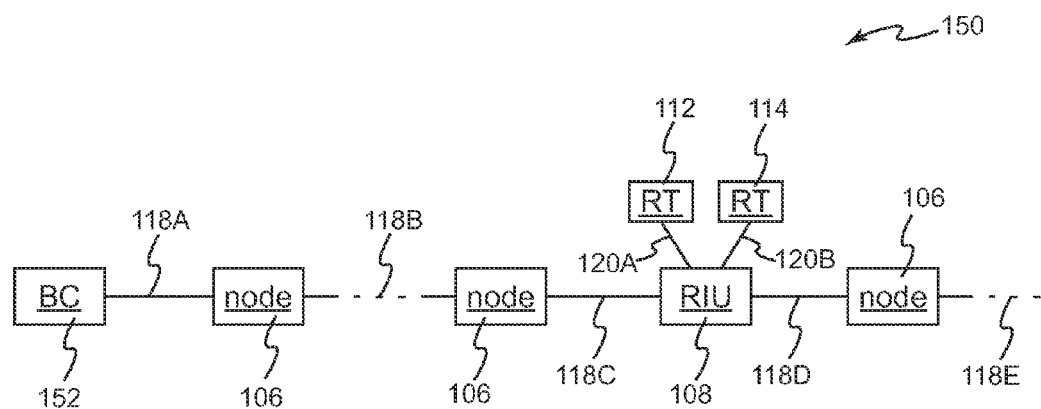
FIG. 1B is a block diagram of an alternate exemplary system facilitating legacy data transmission on a high-speed data bus.

The exemplary system 100 shown in FIG. 1A may be modified in many ways. Any number of native wideband nodes 106 (within the inherent node limits of the native wideband bus employed) may be present in equivalent embodiments, for example, as may any number of legacy nodes 112/114 operating on any number of legacy bus segments 120A-B. Indeed, multiple RIUs 108 may be provided on wideband bus 118, with each RIU 108 coupling any number of legacy bus segments 120 to wideband bus 118. In such embodiments, a single bus controller 102 could be used to manage traffic on each of the various legacy buses, thereby reducing duplication in function and improving cost efficiency in some embodiments. Further, one or more of the RIUs 104/108 could be eliminated in alternate embodiments. FIG. 1B, for example, shows an alternate system 150 for controlling legacy data bus segments 120A-B across wideband bus 118 that includes a bus controller node 152 that is able to natively communicate on wideband bus 118 without an additional RIU 104. Further embodiments that combine the functionalities of BC 102 and RIU 108 are described in detail below.

Figure 2:
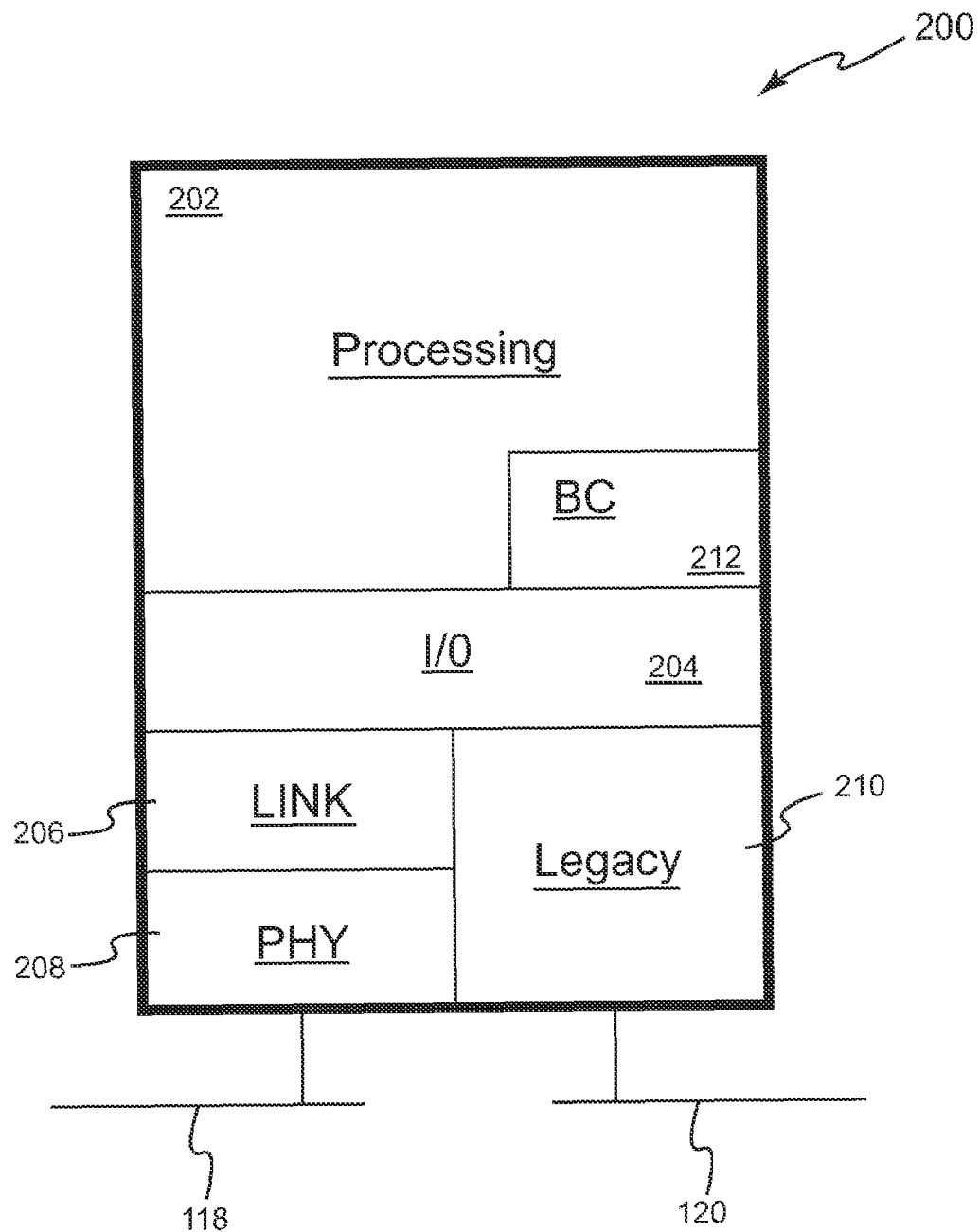
FIG. 2 is a block diagram of an exemplary legacy interface.

As used herein, a "legacy interface" broadly refers to any device or component that provides an interface between a legacy bus and a wideband bus. Examples of legacy interfaces include RIUs 104/108 (FIGS. 1A-1B), bus controller 152 (FIG. 1B), and the like. With reference now to FIG. 2, an exemplary legacy interface 200 suitably includes a legacy input/output (I/O) module 210, wideband PHY and LINK layer implementations 208, 206 (respectively), an I/O subsystem 204, and a data processing module 202.

In an exemplary embodiment, legacy I/O module 210 is implemented with a conventional MIL-STD 1553 card or other implementation available from multiple commercial sources, including Data Device Corp. of Bohemia, N.Y., as well as Condor Engineering Inc. of Santa Barbara, Calif. and others. PHY module 208 and LINK module 206 may be implemented using conventional IEEE 1394b chips, cards or other implementations. Examples of PHY and LINK layer hardware implementations are available from Texas Instruments (TI) of Plano, Tex. and others. Exemplary TI part number TSB81BA3 for a 3-port Cable Transceiver/Arbiter could be used in an exemplary PHY implementation 208, for example, and TI part number TSB82AA2 for a IEEE 1394b Open Host Controller Interface (OHCI) could be used in an exemplary LINK implementation 206. Other protocols, products and/or implementations, however, could be used in a wide range of alternate embodiments. I/O subsystem 204 may be implemented using conventional hardware or software components (e.g. operating system components) that are capable of granting access to I/O resources on legacy interface 200.

Processing module 202 includes any number of applications, applets, programs, routines, objects or the like executing on any processor and written in any programming language. The various programs included within processing module appropriately implement the various functions carried out by legacy interface 200, including data transfer and/or bus control functionality. Bus control module 212, for example, is any computer application, object or other implementation of a legacy bus controller (BC) 102/152 that is capable of being integrated within legacy interface 200. In an exemplary embodiment, bus control module 212 is a software implementation of a legacy bus controller that is capable of communicating with legacy interface 210 to control traffic on legacy bus 120. Examples of bus control software for MIL-STD 1553 buses are available from Condor Engineering and others. Because the BC is located in close proximity to the controlled bus segment, timeout concerns previously experienced on disjoint networks can be significantly reduced as appropriate.

In various embodiments, the computer-executable instructions for the various programs (e.g. BC module 212) included within processing module 202 are stored in digital memory, and may also be stored on a hard drive, flash memory, EEPROM or other digital storage medium. The various components of legacy interface 200 shown in FIG. 2 are intended as logical models, and may be implemented in practice with any type of hardware and/or software. Further, the various functions of the modules described may be organized in different fashions in the various alternate embodiments, with a wide range of equivalent interfaces 200 having additional, fewer, different, or differently combined modules.

A primary function of legacy interface 200 is to allow wideband capable nodes 106 to communicate with and to control legacy RTs 112/114 in their native format. In a typical scenario, wideband-capable nodes 106 normally initiate command requests for data from the RTs 112/114, with the RTs responding as appropriate. In operation, legacy interface 200 suitably acts as a bridge or other interface between legacy network 120 and wideband network 118 in response to control instructions from processing module 202. Accordingly, processing module 202 suitably includes instruction routines and/or modules to receive data from the wideband and legacy buses, and to re-transmit the data on the other network links 118/120 as appropriate to reach their intended destination, and as described more fully below. In various embodiments, processing module 202 is able to receive wideband data from wideband nodes 106 of appropriately sized multiword legacy messages for relay to legacy RTs 112/114 via interface 200 and RIU 108. Processing module 202 conversely is able to receive data (e.g. reply data) from legacy bus 120 and to place such data onto wideband bus 118 to be received by wideband capable nodes 106. Communications are therefore appropriately allowed to proceed in a bi-directional manner, with interface 200 acting as a bridge between bus 118 and bus 120 for communications originating on either bus.

Figure 3:
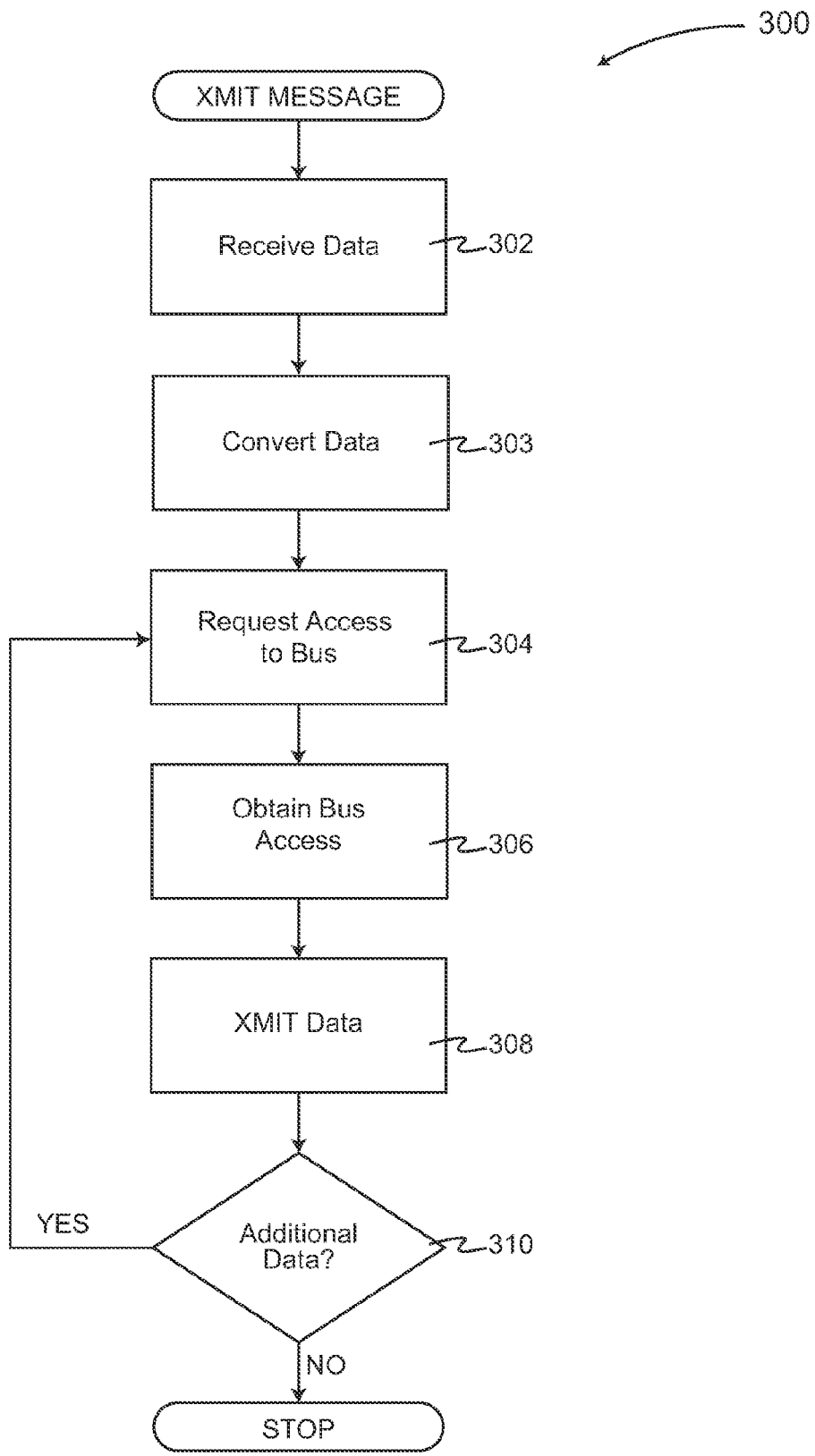
FIG. 3 is a flow chart of an exemplary process for transmitting legacy data on a high-speed data bus.

With reference now to FIG. 3, an exemplary process 300 for providing bi-directional access between a wideband data bus 118 and a legacy bus 120 for passing legacy data between wideband nodes 106 and RTs 112/114 suitably includes the broad steps of receiving the legacy data on either legacy bus 120 or wideband bus 118 (step 302), converting the legacy data to an appropriate format for transmission on the other bus (step 303), issuing a request, as necessary, for access to the other bus (step 304), obtaining access to the bus (step 306), and transmitting the data on the other bus (steps 308, 310). In an exemplary embodiment, process 300 may be implemented and/or controlled in any manner, such as with a digital computer executing programming instructions stored on any digital storage medium such as a static or dynamic random access memory (RAM), floppy disk, compact disk, read-only memory (ROM), or any other digital, optical, and/or electromagnetic storage medium.

Legacy data may be received from a wideband-enabled node 106 on wideband bus 118 or from a RT 112/114 on legacy bus 120 as appropriate. As legacy data is received at a legacy interface 200 (step 302), the legacy data is appropriately formatted (e.g. by processing module 202) for transmission on the other bus. Legacy data from legacy bus 120, for example, may be combined or broken into wideband messages of appropriate size and/or placed within wideband data packets for transmission on wideband bus 118. Conversely, legacy data received on wideband data bus 118 can be joined, divided and/or formatted as appropriate for transmission on legacy bus 120. To transmit the data on the desired bus, legacy interface 200 suitably places an access request, as necessary, on the bus to provide a bridge between the two buses (step 304). The access request may be placed in any appropriate format, and in an exemplary embodiment the request conforms to the arbitration methods provided in IEEE 1394a and 1394b link level implementations. Access to wideband bus 118 may be obtained in any manner (step 306).

Data may be formatted and/or placed on the bus in any number of appropriately-sized single or multi-word messages (steps 303, 308, 310). In an exemplary embodiment, entire multiword legacy messages may be transmitted as single messages on wideband bus 118. An appropriate number of transmitted words for each wideband bus access may be determined to accommodate particular system tolerances and to account for extra latency introduced to the data stream by buffering data cue-up times at legacy interface 200. As an exemplary implementation involving the popular MIL STD 1553 legacy interface with maximum message lengths on the order of thirty words long, such added latency may be on the order of six hundred microseconds or so in each direction. For total messages comprising in excess of thirty words for any given command or RT response, such multiple message portions may be further aggregated into even larger groupings for each wideband bus access consistent with the acceptable level of extra latency thereby introduced. As such, a maximum message grouping length on the IEEE 1394 data bus may be set to be consistent with system tolerances to introduced data latency.

Figure 4:
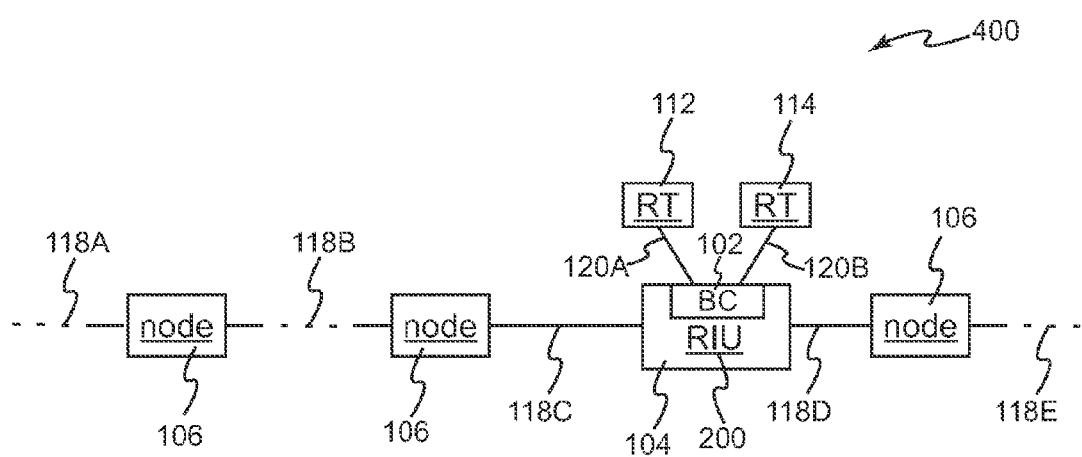
FIG. 4 is a block diagram of an exemplary system for facilitating legacy data transmission on a high-speed data bus including a legacy interface that includes a hybrid bus controller and a remote interface unit.

Accordingly, the functions of the bus controller and legacy interface may be combined into a single interface component and incorporated into a hybrid network environment 400, as shown in FIG. 4. With reference now to FIG. 4, an exemplary system 400 includes a legacy interface 200 that suitably includes both bus controller 102 and RIU 104 functionality. BC functionality may be added to a legacy interface 200 through the addition of a bus controller card, for example, or by adding a software application, applet, daemon or the like, as described in conjunction with FIG. 2 above.

Legacy interface 200 with an embedded BC 102 appropriately acts as a bridge for traffic passing between the legacy and wideband buses. For data exchanged between wideband nodes 106 and RTs 112/114, each wideband node simply transmits data to interface 200, which appropriately converts the data to a suitable legacy format for transmission to the RT on legacy bus 120. Return (i.e., reply) data from legacy nodes 112/114 to wideband nodes 106 is similarly transmitted to interface 200 in legacy format across legacy bus 120A-B, which appropriately forwards the reply data to wideband nodes 106. Bus controller 102 suitably controls traffic transmitted on legacy bus 120, including data transmitted between legacy interface 200 and the various legacy components 112/114.

Systems as described herein may also be employed to interface legacy devices to a wideband/broadband wireless data resource. As used herein, a "wireless data resource" represents, includes, or utilizes, without limitation: wireless data communication links; wireless data communication channels; wireless data transport mechanisms; wireless data communication protocols; wireless data formatting protocols; wireless modulation schemes; or the like. In contrast to the interface systems described above, the following techniques and technologies are suitably configured to leverage high-speed wireless broadband technologies in lieu of (or in addition to) high-speed wired technologies such as IEEE 1394. The wireless systems and techniques described below may share some common features, elements, and characteristics with the wired systems and techniques described previously. For the sake of brevity and for ease of description, such common items may not be redundantly described in the context of the wireless implementations.

Figure 5:
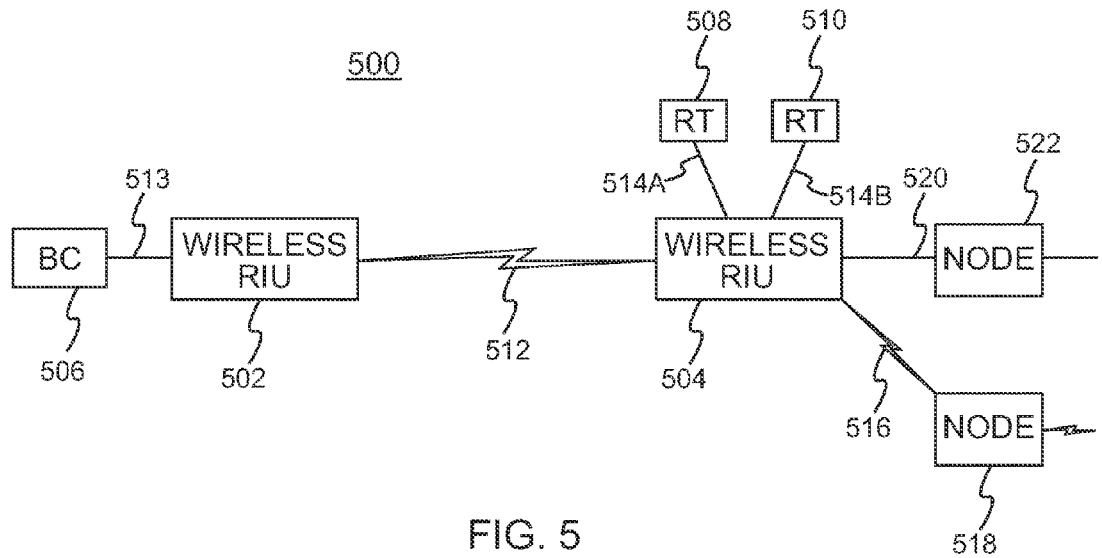
FIG. 5 is a block diagram of a system that facilitates legacy data transmission using a wideband wireless data resource.

FIG. 5 is a block diagram of a system 500 that facilitates legacy data transmission using a wideband wireless data resource. System 500 generally includes one or more wireless remote interface units (RIUs) 502/504 that are configured to enable a legacy bus controller 506 to communicate with one or more remote terminals (RTs) 508/510 using at least one wideband wireless data resource 512. For this embodiment, wideband wireless data resource 512 is depicted as a single wireless data communication link. Wireless RIUs 502/504 are any systems, processing cards, or other computing devices capable of interfacing legacy components to broadband wireless data transport mechanisms, and are described in additional detail below.

Bus controller (BC) 506 may be generally configured as described above for BC 102. However, BC 506 is responsible for directing the flow of data on one or more legacy bus segments 513/514 as appropriate. Accordingly, BC 506 is suitably configured to communicate with wireless RIU 502 via legacy bus segment 513. Legacy bus segment 513 may be realized as a tangible wired connection or link between BC 506 and wireless RIU 502. Likewise, legacy bus segments 514 may each be realized as a tangible wired connection or link between wireless RIU 504 and the respective RT 508/510. In the case of MIL-STD 1553 bus controllers, each bus segment 513/514 may have one or more bus controllers, although only one may be active at any time. RTs 508/510 may be generally configured as described above for RTs 112/114. However, RTs 508/510 are suitably configured to communicate with wireless RIU 504 using legacy bus segments 514a and 514b, respectively, and may include data sensors (e.g., a radio altimeter), navigation aids, or the like. Although two legacy bus segments 514a/514b are shown in system 500, any number of legacy buses and/or segments may be provided in a wide array of equivalent embodiments.

Wideband wireless data resource 512 may be realized as any wireless data communication link, channel, transport mechanism, network interconnection or the like, and wideband wireless data resource 512 may be capable of carrying any number of different wireless signals in a concurrent manner. Wideband wireless data resource 512 is capable of conveying data between wireless RIUs 502 and 504. In certain embodiments, another wideband wireless data resource 516 is utilized to convey wireless information between wireless RIU 504 and a wideband capable node 518. In one exemplary embodiment, wireless RIU 504 utilizes a traditional (wired) wideband data bus segment 520 to communicate data with a wideband capable node 522. For example, wideband data bus segment 520 may operate in compliance with the IEEE 1394b specification or other wideband bus or network technologies as described above in the context of segment 118c of system 100. Nodes 518/522 may operate on wireless data resource 516 and wideband data bus segment 520 (respectively) in a native mode. Accordingly, node 522 may use a wired link (shown unconnected in FIG. 5) to communicate with one or more other network components, while node 518 may use a wireless link (shown unconnected in FIG. 5) to communicate with one or more other wireless network components. Although system 500 is depicted as being interconnected in a linear fashion, other network topologies (e.g., tree, ring, hub and the like) could be used in alternate embodiments.

In operation, BC 506 suitably communicates with remote terminals 508/510 and remotely manages traffic on legacy bus segments 514 via wireless RIUs 502/504. This eliminates the need for local bus controllers and related processing in the remote nodes themselves. Data originating from BC 506 is provided in legacy format from BC 506 to wireless RIU 502 via legacy bus segment 513, which may operate using the same standards and/or protocols as bus segments 514. Wireless RIU 502 suitably receives data via bus segment 513 and interacts with wireless RIU 504 via wideband wireless data resource 512 to transfer data as appropriate.

A wireless RIU can process data in the legacy-to-wireless mode using any suitable technique. For example, a wireless RIU may utilize packetizing techniques to handle the incoming serial stream of 20-bit MIL-STD 1553 words. In accordance with MIL-STD 1553, the 20-bit words are transmitted over legacy MIL-STD 1553 data buses at 1.0 Mbps. Thus, a wireless RIU can be designed to reformat incoming MIL-STD 1553 20-bit words into data packets that are compliant with the chosen wireless data communication protocol. One practical implementation of this approach would be to embed individual MIL-STD 1553 bits into individual messages, thereby minimizing message handshake response delays to on the order of an additional 1 microsecond, or alternatively embedding complete 20-bit MIL-STD-1553 messages into each packetized wireless message, thereby introducing approximately an additional 20 microseconds of handshake latency. Strict adherence to the MIL-STD-1553 specification requires handshake responses to be less than 14 microseconds following the completion of a transmitted message from the bus controller, thereby favoring the use of the individual bit embedding technique. However, common practice in industry allows the handshake response to be adjusted, in the bus controller's software, to longer values (often several tens of microseconds) of handshake response time to accommodate some slower responding remote terminals. As such, the alternative full-word embedding approach would also be acceptable for many applications.

In practice, wireless data resource 512, if utilizing the same type of bit or word packaging, i.e., bit-wise or word-wise embedding into individual message packets, would most likely have an uncontested dedicated link in each direction, thereby eliminating any potential latency that might otherwise arise from handshaking or command-response methodologies, thus improving upon the wired approach. Use of RF wireless standards in the 900 MHz ISM band, or 2.4 and 5.0 GHz bands, with suitable ranges for the intended application (tens of meters or up to tens of miles), and which offer bit rates of 10 Mbps or higher, would be suitable for this purpose. This includes such offerings as 5.0 GHz 802.11a (25-54 Mbps), 2.4 GHz 802.11b (11 Mbps), 802.11g (54 Mbps), and 802.16e (75 Mbps). Digital RF data links based upon these and other standards have been developed, and system 500 may leverage any existing technology or any suitable wireless technology that may be developed in the future.

Alternatively (or additionally), a wireless RIU may be configured to transmit data using modulated wireless data resources. For example, it may be possible to use a wireless link without embedding each bit or word from a legacy component into a data packet; the legacy waveform may be sampled at an appropriate sampling rate to modulate an RF signal such that the modulated RF signal conveys the information received from the legacy component. In one embodiment, a legacy bit pattern (such as a serial stream of MIL-STD 1553 data) is sampled at 2-10 mega samples per second and the sampled data is used to modulate an RF signal using an appropriate modulation technique. Thus, the destination device (another wireless RIU in this example) can simply demodulate the RF carrier to obtain the legacy bit pattern, and it need not extract data from packets or messages. Suitable modulation techniques include, without limitation: bi-phase shift keying (BPSK); quad-phase shift keying (QPSK); 16-QAM; 64-QAM; orthogonal frequency division multiplexing (OFDM); or the like. Such an approach would eliminate the medium access control (MAC) packetizing layer of message transmission used in connection with packetized wireless data communication protocols, but would retain the physical layer modulations for purposes of encoding the data.

A wireless RIU can also be designed to accommodate data reformatting and processing in the wireless-to-legacy mode using any suitable technique. Briefly, such processing is akin to that described above for the legacy-to-wireless mode, but in the "reverse" direction.

In various exemplary embodiments, wireless RIU 502 transfers legacy data from legacy BC 506 by packetizing the data and requesting immediate access to wideband wireless data resource 512. Wireless RIU 504 suitably receives the data packets from wireless RIU 502, re-assembles the data in legacy format, and provides the reformatted data to the destination RT 508/510 via the respective legacy bus segments 514. Return data is sent via an opposite path, with the sending RT 508/510 providing data to wireless RIU 504 via the respective legacy bus segments 514. In turn, wireless RIU 504 establishes a wireless channel, data communication session, or link on wideband wireless data resource 512 to transfer the data to wireless RIU 502. Wireless RIU 502 then re-assembles the data and provides the resulting data in legacy format to BC 506 via legacy bus segment 513.

In practice, each wireless RIU in system 500 will include (or communicate with) a suitably configured modem that performs any necessary conversion to the legacy data communication technology. For example, wireless RIU 504 may include or communicate with a MIL-STD 1553 modem that is compatible with RTs 508/510, and wireless RIU 502 may include or communicate with a MIL-STD 1553 modem that is compatible with BC 506.

The system 500 shown in FIG. 5 may be modified in many ways to suit the needs of the given application. Any number of native wideband nodes 518/520 (within the inherent node limits of the native data communication scheme) may be present in equivalent embodiments, for example, as may any number of legacy RTs 508/510 operating on any number of legacy bus segments 514. Indeed, multiple wireless RIUs 504 may be supported by wideband wireless data resource 512, with each wireless RIU 504 coupling any number of legacy bus segments 514 to wideband wireless data resources. In such embodiments, a single BC 506 could be used to manage traffic on each of the various legacy buses, thereby reducing duplication in function and improving cost efficiency in some embodiments. As another example, an embodiment that combines the functionalities of BC 506 and wireless RIU 504 is described in detail below.

Figure 6:
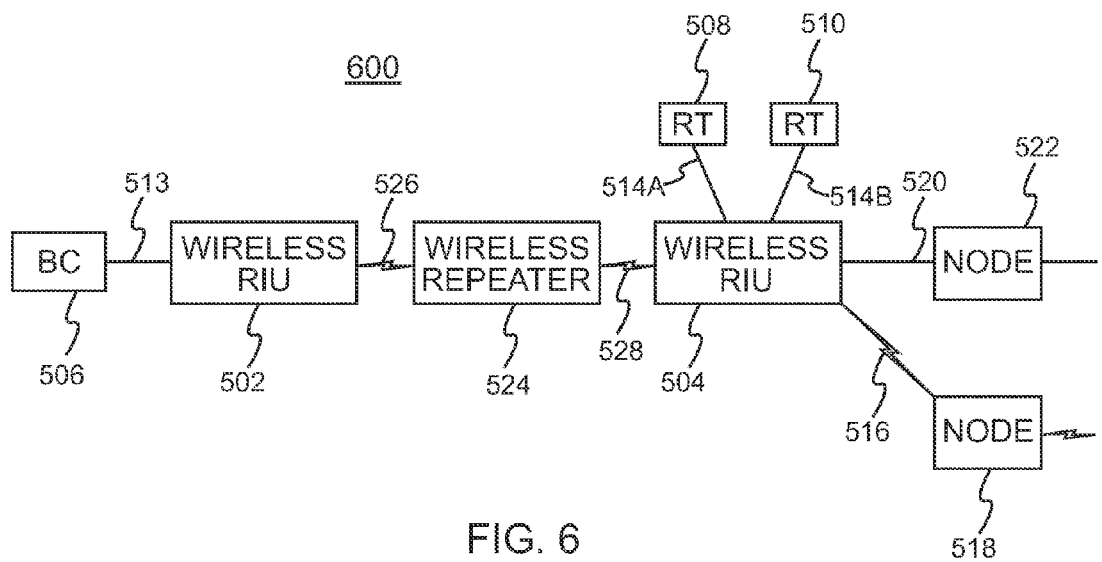
FIG. 6 is a block diagram of another system that facilitates legacy data transmission using a wideband wireless data resource.

FIG. 6 is a block diagram of another system 600 that facilitates legacy data transmission using a wideband wireless data resource. Most of the components in system 600 are identical to like components in system 500. In system 600, however, wireless RIU 502 communicates with wireless RIU 504 via at least one wireless repeater 524. Thus, wireless repeater 524 communicates in a wireless mode with wireless RIU 502 using a first wideband wireless data resource 526, and communicates in a wireless mode with wireless RIU 504 using a second wideband wireless data resource 528. In certain embodiments, wireless data resources 526/528 employ the same wireless data communication protocols, technologies, and schemes. In other words, wireless data resources 526/528 are compliant with each other and wireless repeater 524 functions to extend the wireless transmission ranges of wireless RIUs 502/504.

Figure 7:
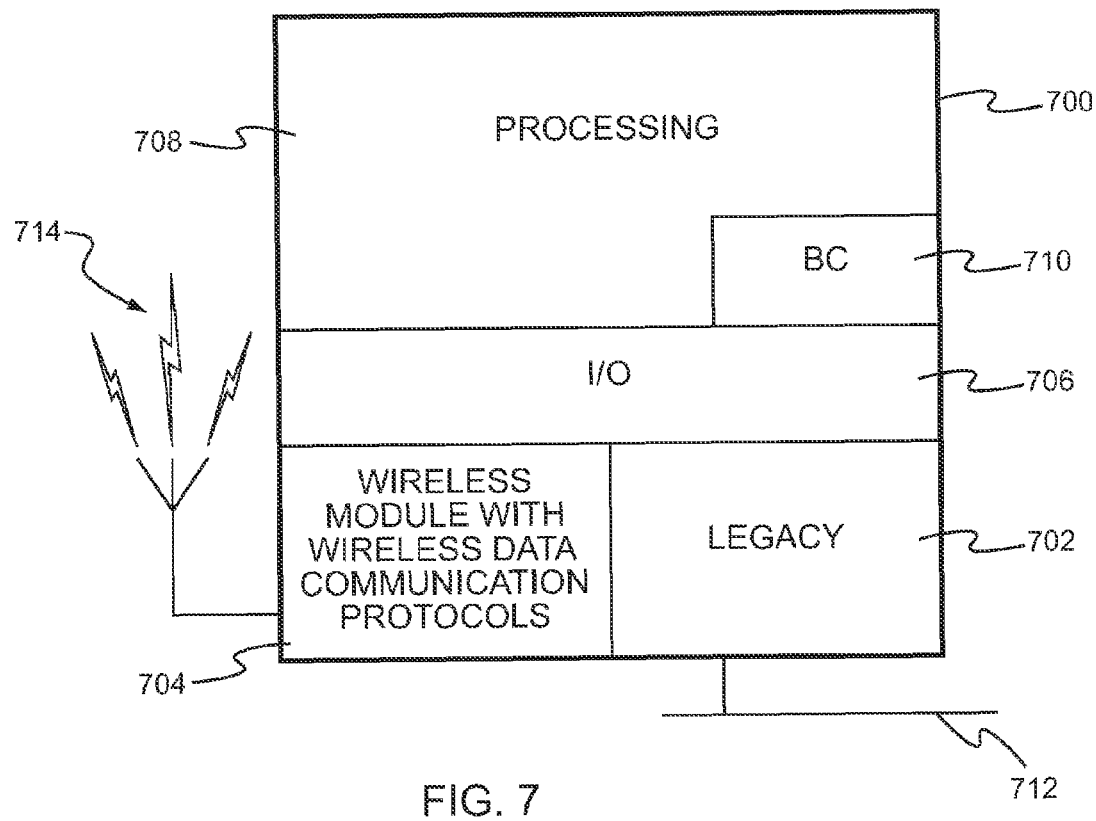
FIG. 7 is a block diagram of a legacy interface suitable for use with various systems described herein, including the systems shown in FIG. 5 and FIG. 6.

As used herein, a "legacy interface" broadly refers to any device or component that provides an interface to a legacy bus. Examples of units containing legacy interfaces include wireless RIUs 502/504 or units that contain a bus controller (e.g., BC 506), and the like. FIG. 7 is a block diagram of a unit that contains a legacy interface 700 suitable for use with various systems described herein, including the systems shown in FIG. 5 and FIG. 6. This unit containing a legacy interface 700 suitably includes a legacy input/output (I/O) module 702, a wireless transceiver module 704, an I/O subsystem 706, and a data processing module 708.

In an exemplary embodiment, legacy I/O module 702 is implemented in the manner described above for legacy I/O module 210 (see FIG. 2). Wireless transceiver module 704 is suitably configured to receive and transmit wireless data communication signals over wireless links that are compliant with the desired wireless data communication protocol used by legacy interface 700. In this regard, wireless transceiver module 704 may utilize any number of suitable wireless data communication protocols, techniques, or methodologies, including, without limitation: RF; IrDA (infrared); Bluetooth; IEEE 802.15 (any variation); IEEE 802.11 (any variation); IEEE 802.16 (any variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

One preferred embodiment of legacy interface 700 utilizes IEEE 802.16(e) as its wireless data communication protocol because IEEE 802.16(e) supports broadband data communication within a 50 kilometer range, which is desirable for many applications. Alternatively, IEEE 802.11 is suitable for short range applications (less than about 200 feet) and IEEE 802.15.3 and IEEE 802.15.4 are suitable for intermediate range applications (less than about 100 meters).

I/O subsystem 706 may be implemented using conventional hardware, software, and/or firmware components (e.g. operating system components) that are capable of granting access to I/O resources on legacy interface 700.

Processing module 708 may be generally configured and realized in the manner described above for processing module 202. For this embodiment, processing module 708 includes a BC module 710, which represents any computer application, object or other implementation of a legacy bus controller that is capable of being integrated within legacy interface 700. In an exemplary embodiment, BC module 710 is a software implementation of a legacy bus controller that is capable of communicating with legacy I/O interface 702 to control traffic on a legacy bus 712. Because the BC module 710 is located in close proximity to the controlled bus segment, timeout concerns previously experienced on disjoint networks can be significantly reduced as appropriate.

One function of legacy interface 700 is to allow wideband capable nodes, such as nodes 518/522 in FIG. 5, to communicate with (and to control) legacy RTs 508/510 in their native format. In a typical scenario, wideband-capable nodes normally initiate command requests for data from the RTs 508/510, with the RTs responding as appropriate. In operation, legacy interface 700 suitably acts as a bridge or other interface between legacy bus 712 and wideband wireless data resources 714 in response to control instructions from processing module 708. Accordingly, processing module 708 suitably includes instruction routines and/or modules to receive data from the wireless data resources and legacy buses, and to reformat and retransmit the data as appropriate to reach their intended destination, and as described more fully below. In various embodiments, processing module 708 is able to receive wideband data (e.g., appropriately sized multiword legacy messages) from wideband nodes for relay to legacy RTs 508/510 via legacy interface 700 and wireless RIU 504. Processing module 708 conversely is able to receive data (e.g., reply data) from legacy bus 712 and to process such data for transmission using wideband wireless data resources 714 to be received by wideband capable nodes. Communications are therefore appropriately allowed to proceed in a bi-directional manner, with legacy interface 700 acting as a bridge between wireless data resources 714 and legacy bus 712 for communications originating in either domain.

Figure 8:
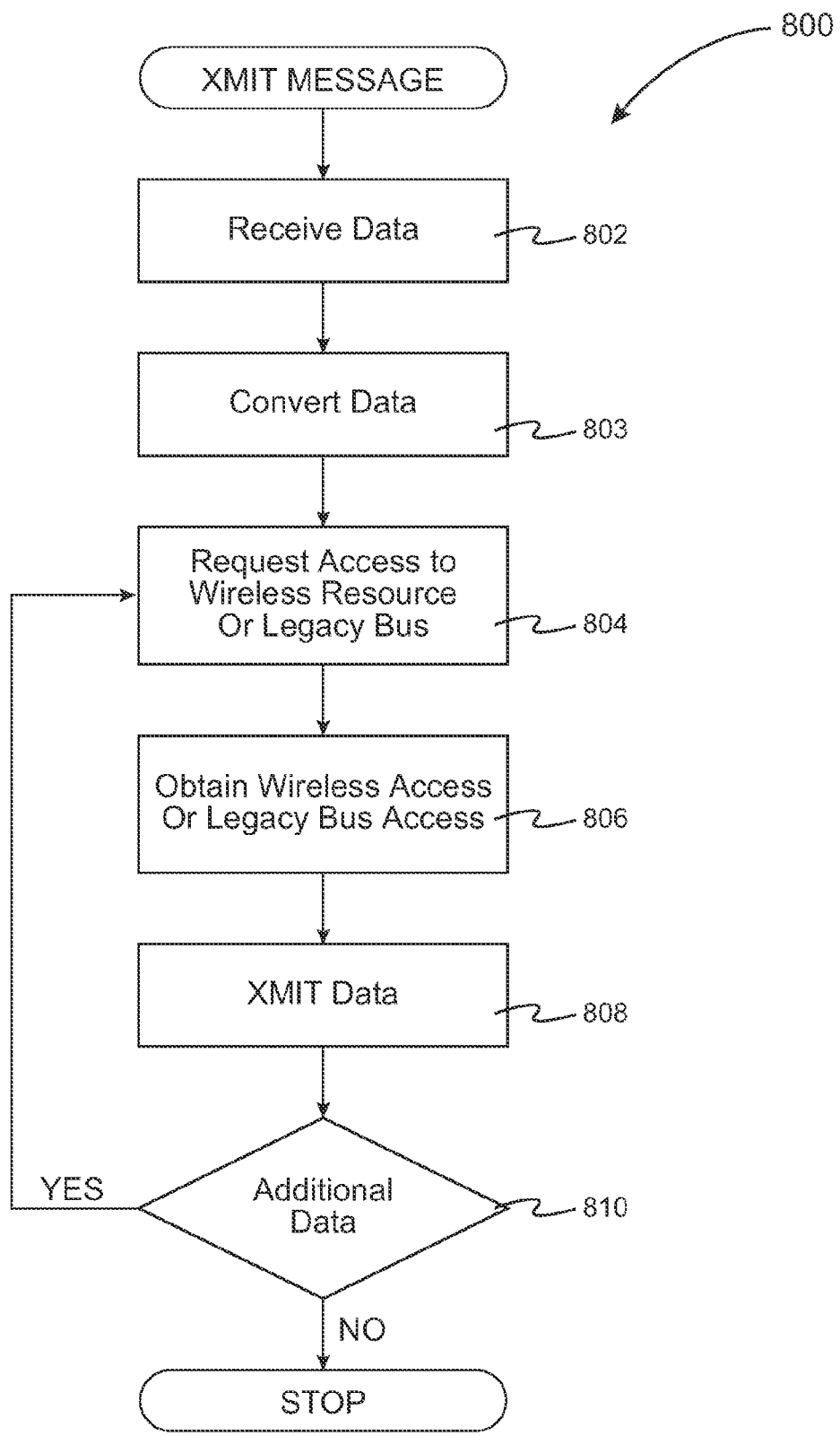
FIG. 8 is a flow chart of a process for transmitting legacy data using a wideband wireless data communication mechanism.

FIG. 8 is a flow chart of a process 800 for transmitting legacy data using a wideband wireless data communication mechanism. Process 800 may be used to provide bi-directional access between a wideband wireless data resource and a legacy data communication bus, and to pass legacy data between wideband nodes and RTs as described above. Process 800 generally includes the broad steps of receiving the legacy data via either the legacy bus or the wideband wireless data resource (task 802), converting the legacy data to an appropriate format for transmission in accordance with the other protocol or transmission mechanism (task 803), issuing a request, as necessary, for access to the wireless data resource or the legacy bus (task 804), obtaining access to the wireless data resource or the legacy bus (task 806), and transmitting the data using the appropriate mechanism, protocol, and transmission scheme (tasks 808 and 810). In an exemplary embodiment, process 800 may be implemented and/or controlled in any manner, such as with a digital computer executing programming instructions stored on any digital storage medium such as a static or dynamic random access memory (RAM), floppy disk, compact disk, read-only memory (ROM), or any other digital, optical, and/or electromagnetic storage medium.

Legacy data may be received from a wideband-enabled node or from an RT 508/510 on legacy bus 712 as appropriate. As legacy data is received at a legacy interface 700 (task 802), the legacy data is appropriately formatted (e.g., by processing module 708) for transmission using either legacy bus 712 or wireless data resource 714 depending upon the direction of the data flow. Legacy data from legacy bus 712, for example, may be combined or broken into wideband messages of appropriate size and/or placed within wideband data packets for transmission via wideband wireless data resource 714. Conversely, legacy data received using wideband wireless data resource 714 can be joined, divided and/or formatted as appropriate for transmission on legacy bus 712. To transmit the data in the desired format, legacy interface 700 suitably generates an access request, as necessary, to provide a bridge between the two data communication domains (task 804). The access request may be placed in any appropriate format; access to wideband wireless data resource 714 may be obtained in any manner (step 806).

Data may be formatted and/or transmitted in any number of appropriately-sized single or multi-word messages (tasks 303, 308, and 310), typically containing a single bit or word of a MIL-STD-1553 message stream. However, in a further exemplary embodiment, where an extremely long handshake remote terminal response delay may be tolerated by the bus controller software (which would be an unusual embodiment of this message handling), entire multiword legacy messages may be transmitted as single messages using wideband wireless data resource 714. An appropriate number of transmitted words for each wireless link access may be determined to accommodate particular system tolerances and to account for extra latency introduced to the data stream by buffering data cue-up times at legacy interface 700. As an exemplary implementation involving the popular MIL-STD 1553 legacy interface with maximum message lengths on the order of thirty words long, such added latency may be on the order of six hundred microseconds or so in each direction. For total messages comprising in excess of thirty words for any given command or RT response, such multiple message portions may be further aggregated into even larger groupings for each wireless link access consistent with the acceptable level of extra latency thereby introduced. As such, a maximum message grouping length associated with wireless data resource 714 may be set to be consistent with system tolerances to introduced data latency.

Figure 9:
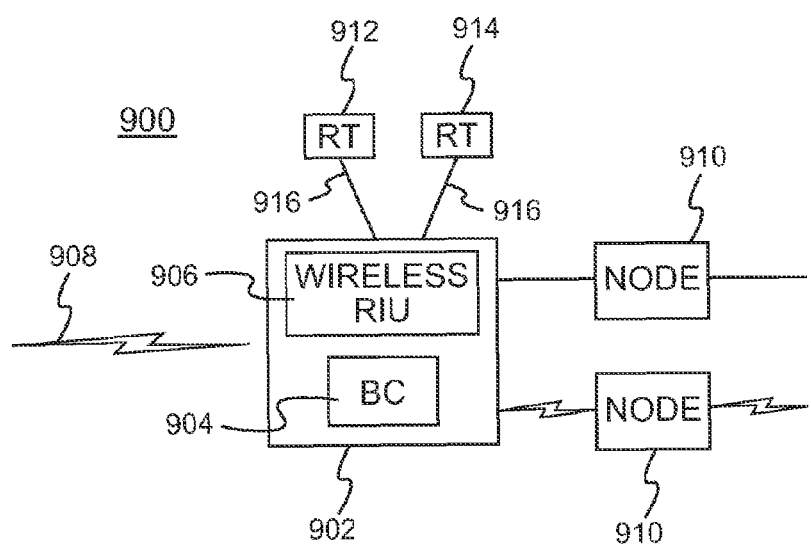
FIG. 9 is a block diagram of an exemplary system for facilitating legacy data transmission on a high-speed wireless link, where the system has a legacy interface that includes a hybrid bus controller and a remote interface unit.

Accordingly, the functions of a BC and a legacy interface may be combined into a single interface component and incorporated into a hybrid network environment, as shown in FIG. 9. With reference now to FIG. 9, an exemplary system 900 includes a legacy interface 902 that suitably includes the functionality of a BC 904 and a wireless RIU 906. BC functionality may be added to legacy interface 902 through the addition of a bus controller card, for example, or by adding a software application, applet, daemon or the like, as described in conjunction with FIG. 2 above.

Legacy interface 902 with an embedded BC 904 appropriately acts as a bridge for traffic passing between a legacy bus and a wideband wireless data resource 908. For data exchanged between wideband nodes 910 and RTs 912/914, each wideband node 910 simply transmits data to legacy interface 902, which appropriately converts the data to a suitable legacy format for transmission to the RT 912/914 on a respective legacy bus 916. Return (i.e., reply) data from legacy RTs 912/914 to wideband nodes 910 is similarly transmitted to legacy interface 902 in legacy format across a legacy bus 916, which appropriately forwards the reply data to wideband nodes 910. Bus controller 904 suitably controls traffic transmitted on legacy buses 916, including data transmitted between legacy interface 902 and the various legacy RTs 912/914.

While several exemplary embodiments have been presented in the foregoing detailed description, it should be appreciated that a vast number of equivalent variations exist. Although the systems and techniques described herein are frequently described as interfacing MIL-STD 1553 devices to specific broadband data communication architectures and technologies, the invention is not so limited. Indeed, any legacy and/or wideband (wired or wireless) technologies could be used in various alternate but equivalent embodiments. It should also be appreciated that the exemplary embodiments are only examples, and are not intended to limit the scope, applicability, or configuration of the invention in any way. Rather, the foregoing detailed description will provide those skilled in the art with a convenient road map for implementing exemplary embodiments. It should be understood that various changes can be made in the function and arrangement of elements and/or steps without departing from the scope of the invention as set forth in the appended claims and the legal equivalents thereof.

What is claimed is:

1. A method of interfacing a legacy data bus to a wideband wireless data resource with a legacy interface having a bus controller module, the method comprising:

wirelessly receiving data at the legacy interface via the wideband wireless data resource, from a wideband capable node, the data being intended for a legacy node, wherein the legacy node is a MIL-STD 1553 node;

converting the received data to a legacy format comprising at least one data word, wherein the legacy format is compliant with MIL-STD 1553;

transmitting the at least one data word on the legacy data bus, wherein the legacy data bus is a MIL-STD 1553 bus;

receiving a reply to the at least one data word on the legacy data bus; and forwarding the reply via a wireless data communication link to a wideband capable node using the bus controller module in the legacy interface.

2. A method according to claim 1, wherein:

the wideband wireless data resource is compliant with IEEE 802.11;

the wideband capable node is compliant with IEEE 802.11; and the reply is forwarded via an IEEE 802.11 link.

3. A method according to claim 1, wherein:
the wideband wireless data resource is compliant with IEEE 802.15.3;
the wideband capable node is compliant with IEEE 802.15.3; and
the reply is forwarded via an IEEE 802.15.3 link.

4. A method according to claim 1, wherein:
the wideband wireless data resource is compliant with IEEE 802.15.4;
the wideband capable node is compliant with IEEE 802.15.4; and
the reply is forwarded via an IEEE 802.15.4 link.

5. A method according to claim 1, wherein:
the wideband wireless data resource is compliant with IEEE 802.16(e);
the wideband capable node is compliant with IEEE 802.16(e); and
the reply is forwarded via an IEEE 802.16(e) link.

6. A method according to claim 1, wherein the converting step comprises encapsulating individual information bits or individual words of MIL-STD-1553 data into individual wideband wireless data packets, consistent with a tolerance for introduced latency.

7. A method according to claim 1, wherein the converting step comprises encapsulating multiple words of MIL-STD-1553 data into individual wideband wireless data packets, consistent with a tolerance for introduced latency.

8. A method according to claim 1, wherein:
the converting step comprises encoding an individual bit stream of MIL-STD-1553 data onto a wideband wireless data link; and
the method further comprises demodulating the wideband wireless data link and converting back into a facsimile of the individual bit stream of MIL-STD-1553 data.

9. A digital storage medium having computer-executable instructions stored thereon, wherein the instructions are configured to execute the method of claim 1.

10. A system for interfacing a legacy device with a wideband wireless data resource, the system comprising:
a wireless remote interface module configured to receive data intended for a legacy node via the wideband wireless data resource, and to convert the received data to a legacy format having at least one data word, wherein the legacy node is a MIL-STD 1553 node and wherein the legacy format is compliant with MIL-STD 1553; and
a bus controller module configured to control traffic on a legacy bus to thereby transfer the at least one data word from the wireless remote interface module to a legacy component on the legacy bus, wherein the legacy bus is a MIL-STD 1553 bus.

11. A system according to claim 10, wherein:
the bus controller module is further configured to receive a reply message in the legacy format from the wireless remote interface module; and
the wireless remote interface module is further configured to receive the reply message, to convert the reply message into a reformatted reply message that is compliant with the wideband wireless data resource, and to forward the reformatted reply message using the wideband wireless data resource.

12. A system according to claim 10, wherein the legacy device is a MIL-STD 1553 device.

13. A system according to claim 10, wherein the wideband wireless data resource is an IEEE 802.11 link.

14. A system according to claim 10, wherein the wideband wireless data resource is an IEEE 802.15.3 link.

15. A system according to claim 10, wherein the wideband wireless data resource is an IEEE 802.15.4 link.

16. A system according to claim 10, wherein the wideband wireless data resource is an IEEE 802.16(e) link.

17. A system according to claim 10, wherein the wireless remote interface module is configured to:
receive the data via a modulated RF carrier signal that has been modulated with a legacy bit pattern, and
demodulate the modulated RF carrier signal to obtain the legacy bit pattern.

18. A system for interfacing a legacy bus with a wideband wireless data transport mechanism, the system comprising:
a legacy bus interface in communication with the legacy bus, wherein the legacy bus is a MIL-STD 1553 bus;
a wireless transceiver module in communication with the wideband wireless data transport mechanism, the wireless transceiver module being compliant with a wideband wireless data communication protocol used by the wideband wireless data transport mechanism; and
a processing module configured to provide a bridge between the legacy bus interface and the wireless transceiver module via an input/output subsystem; wherein
the processing module is operable to receive legacy data from the legacy bus via the legacy bus interface, to request a wireless resource maintained by the wideband wireless data transport mechanism for at least a portion of the legacy data, and to control transmission of the legacy data using the wireless resource, wherein the legacy data is in a legacy format compliant with MIL-STD 1553; and
the processing module comprises a bus controller module configured to control traffic on the legacy bus via the legacy bus interface.

19. A method of interfacing a MIL-STD 1553 data bus to an IEEE 802.16(e) wireless data resource with a legacy interface comprising a bus controller module and a wireless remote interface unit, the method comprising:
receiving a message intended for a MIL-STD 1553 device on the MIL-STD 1553 data bus via the IEEE 802.16(e) wireless data resource;
converting, at the wireless remote interface unit, data conveyed in the message into at least one data word in a legacy format;
controlling traffic on the MIL-STD 1553 data bus with the bus controller module to transfer the at least one data word between the wireless remote interface unit and a MIL-STD 1553 device on the MIL-STD 1553 data bus; and
repeating the controlling step until all of the data conveyed in the message is transmitted on the MIL-STD 1553 data bus.

20. A method according to claim 19, further comprising adjusting a maximum timeout budget for transmission of MIL-STD 1553 data.

21. A method according to claim 19, further comprising setting a maximum message grouping length for the IEEE 802.16(e) wireless data resource consistent with a tolerance to introduced data latency.

22. A digital storage medium having computer-executable instructions stored thereon, wherein the instructions are configured to execute the method of claim 19.

* * * * *